Figure 1:
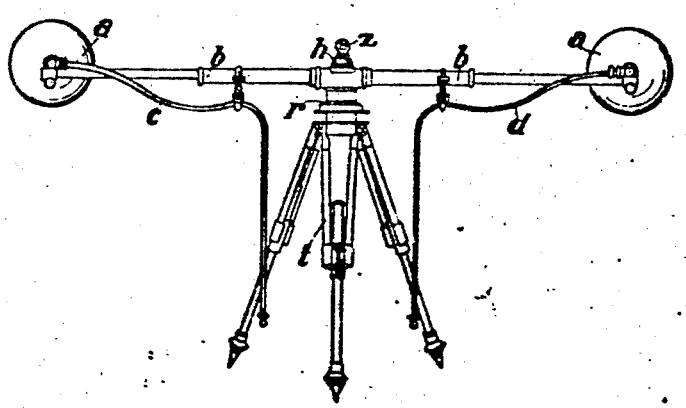

Sept. 11, 1923.

E. M. VON HORNBOSTEL ET AL

METHOD AND MEANS FOR DETERMINING THE DIRECTION OF SOUNDS

Filed March 8, 1920    2 Sheets-Sheet 1

Inventors,
Erich Moritz von Hornbostel
Max Wertheimer
By: 
Attorneys

Patented Sept. 11, 1923.

1,467,545

UNITED STATES PATENT OFFICE.

ERICH MORITZ VON HORNBOSTEL, OF STEGLITZ, NEAR BERLIN, AND MAX WERTHEIMER, OF BERLIN, GERMANY.

METHOD AND MEANS FOR DETERMINING THE DIRECTION OF SOUNDS.

Application filed March 6, 1920. Serial No. 364,245.

(GRANTED UNDER THE PROVISIONS OF THE ACT OF MARCH 3, 1921, 41 STAT. L., 1313.)

*To all whom it may concern:*

Be it known that we, ERICH MORITZ VON HORNBOSTEL and MAX WERTHEIMER, citizens of the Austrian Republic and of the Czechoslovakian Republic, respectively, residing at Steglitz, near Berlin, and Berlin, Germany, respectively, have invented certain new and useful Improvements in Methods and Means for Determining the Direction of Sounds, (for which we have filed applications in Germany, July 6, 1915, patent issued Sept. 28, 1920, No. 301,669; Austria, November 17, 1915; Hungary, November 16, 1915; Japan, September 9, 1920; Canada, September 14, 1920; Belgium, June 28, 1920; Spain, September 1, 1920; Holland, November 14, 1919; Holland, September 18, 1920; Denmark, March 15, 1920; Norway, March 22, 1920; Italy, June 26, 1920; Chile, October 23, 1920; Argentina, October 20, 1920; England, February 5, 1920; Sweden, November 14, 1919; France, January 23, 1920), of which the following is a specification.

Our invention refers to the determination of the direction of the approach of sounds and more especially to a method for rendering such determination more exact. The invention further comprises certain means for carrying such method into practice.

We have ascertained that the perception and determination of the direction of sounds is dependent on the absolute difference of time consumed by the sound in reaching the ears of the observer. According to the present invention, we utilize the well-known faculty of the ear to discern directions, for increasing the exactitude in the determination of the direction of sounds received by aid of special receivers, by converting a lateral impression of direction into a central one.

This may be effected for instance by arranging the receivers, such as funnel-shaped mouthpieces or microphones, at the ends of a carrier capable of being turned in a predetermined plane about its center. Supposing now the sound to be perceived as coming from the right or the left, then the carrier or receiver basis is turned about its central axis, the observer thereby getting the impression that the sound changes its direction as the carrier is turning. The carrier can be set in such a position that the observer imagines the sound to arrive neither from the right nor from the left but right from before or from behind. This is the case where, all other physical conditions being equal, the distances between the source of sound and the two receivers are equal, or in other words, where the vertical erected in the center of the line connecting the two receivers meets the source of sound. In this case the angle of deflection of the carrier from its zero position offers a measure for the deflection of the true direction of sound.

Apparently the turning of the carrier or receiver base may be effected by causing the observer's stand such as a vehicle or a vessel to turn as a whole. But when the lateral impression of the direction would be converted into a central one, the whole ship must be turned, which is a very difficult matter in a rough sea and requires changing the course of the vessel.

In contradistinction thereto the method according to the present invention consists in converting a lateral impression into a central one without the observer's stand being turned.

This mode of proceeding is of special importance for nautical purposes inasmuch as the course of a ship need no more be changed in order to determine the direction of sound.

In the drawings affixed to this specification and forming a part thereof two modifications of a receiver instrument according to the present invention are illustrated. In the drawings Fig. 1 is a perspective view of the instrument as a whole, while Fig. 2 is a plan showing a modified arrangement of the sound receiving means.

Figure 3:
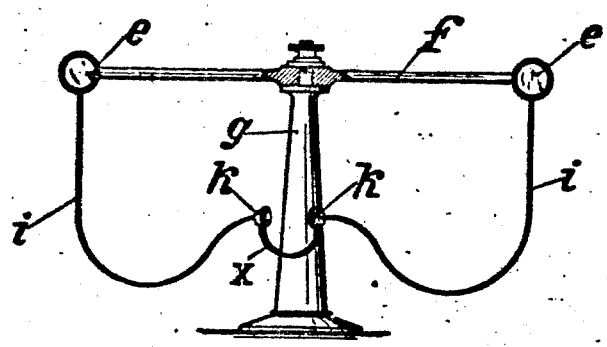
Figure 4:
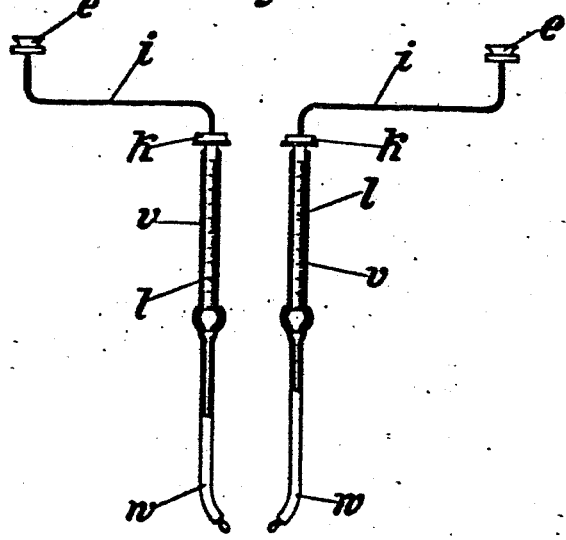

The Figs. 3 and 4 show each partly in side elevation partly in vertical section a third and fourth modified arrangement of the sound receiving means.

Figure 2:
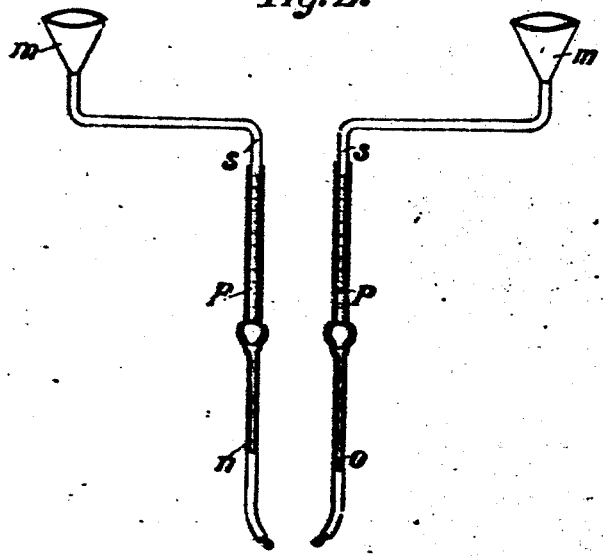

Referring to Fig. 1, $a$, $a$ are the sound receivers and $b$ is a horizontal carrier capable of turning about a vertical axis $A$ on a tripod $t$ and having the receivers $a$ fixed to its ends at an even distance from the said axis. $r$ is a scale allowing to ascertain the deviation from zero of the carrier and $s$ is a telescope for adjusting it in its zero position in a well-known manner. The sound is conducted from the receivers to the observer's ears for instance by aid of two tubes c and d of equal length.

The observer may take any desired position relatively to the zero position and need not follow the movements of the receivers.

The plane in which the carrier is turning may be horizontal or vertical or inclined. In the case of a carrier turning in a vertical plane the elevation of the direction of sound relatively to the horizontal can be determined. By combining a horizontal and a vertical carrier in one instrument two observers may simultaneously determine the lateral deviation and the elevation.

The lateral impression of direction may further be converted into a central one by either altering the distance of sound transmission from one receiver to the ear connected therewith or by altering the distance between both receivers and the respective ears connected therewith in an opposite sense, and measuring the difference. A device adapted to carry this latter method into practice is illustrated diagrammatically in Fig. 2.

$m$, $m$ are two stationary receivers and $n$ and $o$ are separate tubes serving to conduct the sound from said receivers into the ears of the observer. The tubes $n$ and $o$ are connected with the receiver tubes $s$, $s$ by aid of tubular sleeves $p$, $p$ adapted to be axially displaced thereon, the tubes $s$, $s$ being divided so that the increase or reduction of the distance of transmission can easily be ascertained.

In the modified arrangement of the receiver means according to Fig. 3 electric receivers or microphones $e$, $e$ are employed, which can be turned with their base $f$ about its middle axis. The receivers $e$, $e$ are connected by electric conduits $i$, $i$ to the telephones $k$, $k$ serving to conduct the sound to the observer's ears. The telephones $k$, $k$ are connected by head band $x$ but are not electrically connected to each other.

The arrangement according to Fig. 4 differs from the apparatus according to Fig. 3 thereby, that the telephones $k$, $k$ are connected to the tubes $l$, $l$. On said tubes $l$, $l$ the sleeves $v$, $v$ are placed which can be axially displaced thereon. The sleeves $v$, $v$ are connected to the receiver tubes $w$, $w$, serving to conduct the sound from the telephones $k$, $k$ to the observer's ears.

As the observer cannot ascertain with a single position of the carrier, whether the sound comes from before or from behind, the method described may be further improved by observing by aid of two or more carriers enclosing an angle between them.

The novel method can of course be carried into practice in any medium whatever provided that suitable receivers are employed and the carrier is constructed in accordance with the velocity of sound in the respective medium.

It will be understood by those skilled in the art that the adjustment of the paths of travel and the adjustment of the times of travel are equivalent phrases as the comparison to be made is that of the times of arrival of sounds at the two ears of the observer and these times may be synchronized, for example, by adjusting the relative lengths of the paths according to circumstances.

We claim:—

1. That method of determining the direction of sound by the aid of apparatus having two receivers spaced apart, faced in the same direction, and arranged whereby each will receive the same sound with substantially the same freedom from obstruction, and having individual connections therefrom to the ears of the observer, which consists in setting said apparatus in an initial position, with the observer assuming a definite and fixed orientation relative to said position, and thereafter adjusting said apparatus so that the sounds from the receivers will be brought simultaneously to the observer's ears and the impression of lateral directions will be converted into an impression of central direction without changing the orientation of the observer.

2. That method of determining the direction from which a sound arrives which consists in providing an apparatus having two receivers spaced apart with an individual connection from each to an ear of the observer, whereby there may be created a time interval between the arrival of sound at the two ears of the observer by reason of the difference in length of the separate paths of the sound from the source to the observer's ears, said receivers being arranged so as to receive the sound with substantially equal intensity, and thereafter equalizing the separate paths of the sound from its source to the two ears of the observer by adjusting the apparatus without changing the observer's orientation whereby the instant of arrival of the sound at the two ears of the observer may be synchronized, thus converting a lateral impression of direction into a central impression of direction and determining the actual direction by measuring the amount of compensation necessary to cause such equalization.

3. The method of determining the direction of sound by the use of apparatus comprising separated artificial receivers connected to the ears of the observer by separate paths, which consists in relatively adjusting said paths in the apparatus so as to convert a lateral impression of direction into a central impression of direction while maintaining the receivers in a fixed position.

4. The method of determining the direction of sound by the use of apparatus comprising separated artificial receivers connected to the ears of the observer by separate paths which consists in relatively adjusting said paths in said apparatus so as to convert a lateral impression of direction into a central impression of direction while maintaining the receivers in a fixed position, and determining the actual direction by measuring the amount of adjustment necessary to produce such central impression.

5. Means for determining the direction of sound which comprises two fixed receivers spaced apart, and separate means for connecting each receiver with an ear of the observer, at least one of said connecting means being adjustable with relation to the other whereby the relative paths of travel of the sound from the receivers to the ears of the observer may be varied.

6. Means for determining the direction of sound which comprises two fixed receivers spaced apart, and separate means for connecting each receiver with an ear of the observer, at least one of said connecting means being adjustable with relation to the other whereby the relative paths of travel of the sound from the receivers to the ears of the observers may be varied, and means for measuring such adjustment.

7. Means for determining the direction of sound which comprises two fixed receivers spaced apart, each receiver having a tubular connection adapted to lead to one of the ears of the observer, at least one of said tubular connections being adjustable in length whereby the relative paths of travel of the sound from the receivers to the ears of the observer may be varied.

8. Means for determining the direction of sound which comprises receivers spaced a distance apart, each receiver being provided with separate means to convey sound from it to the ear of the observer, each of said conveying means being adjustable whereby the relative paths of travel of the sound from each receiver to each ear of the observer may be varied.

In testimony whereof we affix our signatures.

ERICH MORITZ von HORNBOSTEL.
MAX WERTHEIMER.